Nov. 11, 1958  H. BLACKSTONE ET AL  2,859,653
WIDE-ANGLE PRISM SCANNER
Filed Feb. 21, 1955
FIG. 1.
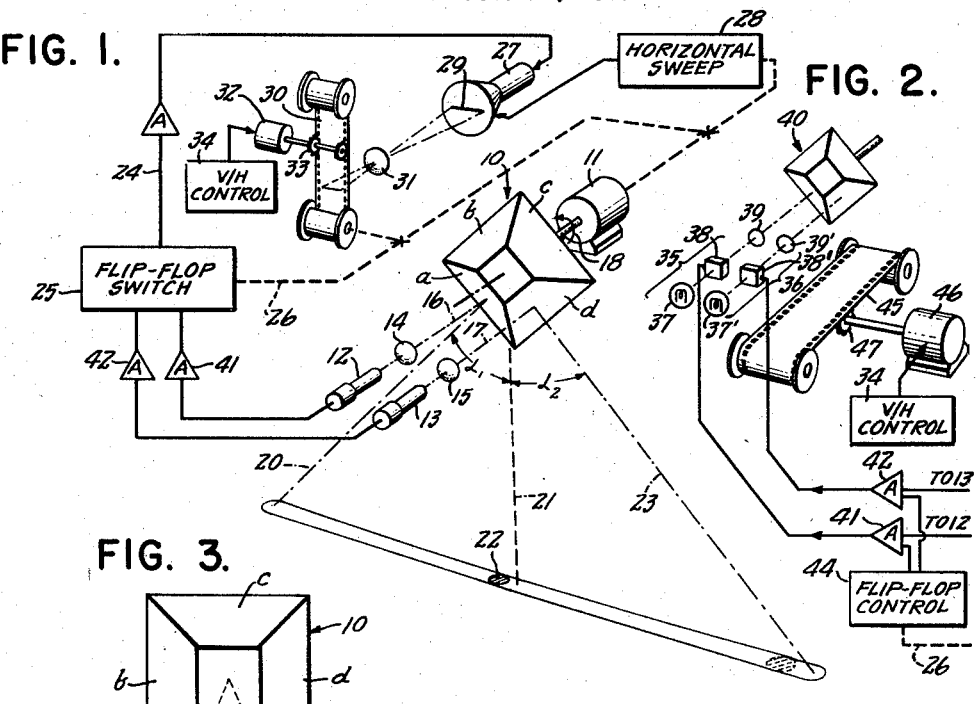
FIG. 2.
FIG. 3.
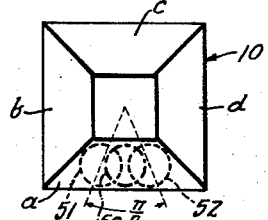
FIG. 4.
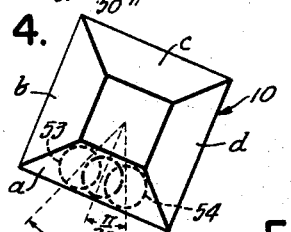
FIG. 5.
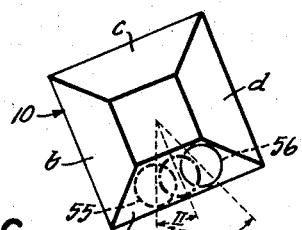
FIG. 6.
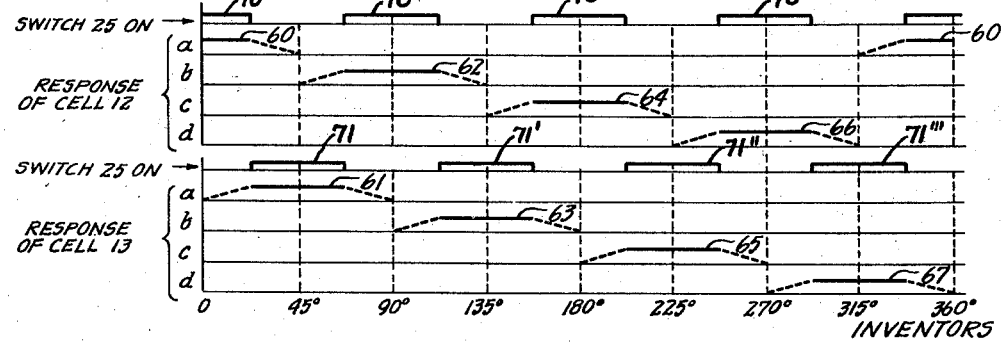
INVENTORS
HENRY BLACKSTONE
FRANK G. WILLEY
BY
ATTORNEYS

2,859,653
Patented Nov. 11, 1958

2,859,653

WIDE-ANGLE PRISM SCANNER

Henry Blackstone, Northport, and Frank G. Willey, Roslyn Heights, N. Y., assignors to Servo Corporation of America, New Hyde Park, N. Y., a corporation of New York Application February 21, 1955, Serial No. 489,606

9 Claims. (Cl. 88—1)

Our invention relates to optical scanning means and to radiation-responsive means utilizing such optical scanning. This invention represents improvement over and modification of the disclosures in copending patent applications Serial No. 320,272, filed November 13, 1952, and Serial No. 364,075, filed June 25, 1953.

It is an object of the invention to provide improved means of the character indicated.

It is another object to provide improved scanning and display means for continuously and automatically covering a field of view for energy levels in such field.

It is a specific object to meet the above objects with a device having an inherently wide angle of view about the scanning axis.

It is a further specific object to provide a scanner having a scanning angle inherently characterized by a minimum of dead or non-utilizable time.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a diagram schematically illustrating component parts of a device incorporating features of the invention, certain parts being shown in perspective with a schematic representation of a scanning line located beneath the scanner;

Fig. 2 is a view similar to Fig. 1, but showing alternative display elements for part of the device of Fig. 1;

Figs. 3, 4 and 5 are end elevations of a scanner element, illustrating functioning of the scanner of Fig. 1; and Fig. 6 is a graphical representation of functioning of the device of Fig. 1.

Briefly stated, our invention contemplates the employment of a rotating pyramid mirror in conjunction with energy-responsive elements, whereby each of two elements may be caused in alternation to scan adjacent segments of an elongated scan line in the field of view, throughout a single continuous cycle of rotation of the prism mirror. For aerial-reconnaissance purposes, the mirror may be mounted for continuous rotation about its central axis with said axis oriented substantially parallel to the flight axis. Separate optical systems associated with each energy-responsive element may have characteristic response axes substantially parallel to each other and to the axis of rotation, said element axes being generally offset below said axis of rotation and symmetrically spaced on opposite sides of the vertical plane including the flight axis. For optimum use of the parts, we prefer that the angular separation of optical axes about the rotation axis shall be substantially equal to $\pi$, divided by the number of faces of the pyramid mirror.

Referring to Fig. 1 of the drawings, our invention is shown in application to a scanner comprising a prism mirror 10, and means 11 for continuously rotating the same about its central axis, said axis being, in the case of aircraft-reconnaissance applications, oriented substantially parallel to the flight axis. It will be understood that where the situation requires utmost fidelity of scanning, suitable means (not shown) may be provided for stabilizing the mounting of motor 11 in the airplane, but that, for all practical purposes, the axis of rotation of motor 11 may be called relatively fixed. The stabilizing means would also support two energy-responsive elements or cells 12—13; thus, for the same reason, these elements and the optics 14—15 associated therewith are referred to as relatively fixed. The optics 14—15 may image each cell on substantially parallel axes 16—17 in a remote plane but, by interposing the prism 10, these axes are deflected in a generally vertically downward radial plane through which the images of the respective elements 12—13 are swept in accordance with scanner rotation. For aircraft-reconnaissance purposes, the axes 16—17 are preferably located below the mirror 10 and symmetrically on opposite sides of that vertical plane which includes the axis of rotation of mirror 10; and the angular spacing of axes 16—17 about the axis of rotation of mirror 10 is preferably substantially $\pi$, divided by the number of faces of mirror 10. In the form shown, mirror 10 has four sloping faces $a, b, c, d$ and therefore the separation between axes 16—17 is substantially 45 degrees.

In operation, as mirror 10 is continuously rotated, as in the direction of arrow 18, any one surface, say the surface $a$, will first intercept the axis 16 and will therefore cause imaging of a first energy-responsive element 12 on the terrain. When the first bundle of rays developed by focusing optics 14 is fully intercepted by surface $a$, a fully imaged spot will first be developed optically at the limit 20 of the line to be scanned across the field. Further mirror rotation will cause the spot to progress across the field to an intermediate limit 21, the spot 22 (representing such an image) being shown at an instant close to the limit 21. During traverse of the imaged spot 22 between limits 20 and 21, the electric-signal output (hereinafter sometimes referred to as the video output) of element 12 will faithfully reflect varying energy levels along the first half of the scan line.

After reaching limit 21, the bundle of rays developed by optics 14 will no longer be fully intercepted by surface $a$, but the full bundle of rays collected by optics 15 will, for the first time, be intercepted by surface $a$. For continued rotation of the mirror 10, therefore, the video output of element 13 will faithfully reproduce varying energy levels along the second half of the scan line, until attainment of the outer field limit 23, at which time mirror surface $a$ will begin to pass out of the full bundle of rays collected by optics 15. Thus, for a full scan line between limits 20—23, the video output of element 12 will faithfully reflect varying energy levels between limits 20—21 and, immediately and continuously thereafter, the video output of energy-responsive element 13 will similarly reflect varying energy levels along the scan line between limits 21—23.

For display purposes, we commutate only the video outputs representing full collection of rays by way of mirror 10. In the form shown in Fig. 1, commutation is effective to develop (in a single output line 24) a continuous video signal reflecting the full sweep between limits 20—30 of the field. For this purpose, we show a flip-flop switch 25 having two inputs for the respective video outputs of energy-responsive elements 12—13; by means of the dashed line 26, we suggest synchronized operation of switch 25 with rotation of the prism 10. The display device shown happens to be of the variety employing a cathode-ray tube 27 and having an intensity-modulation connection supplied by the single line 24; horizontal-sweep means 28, synchronized with scan rotation, develops the necessary deflection voltage at a rate corresponding to one full horizontal sweep every $$\frac{2\pi}{n} \text{ radians of rotation of the scanner}$$

where $n$ is the number of reflecting surfaces of the prism. The field between limits 20—23 is thus 90 degrees for the four-faced (square) pyramid 10 shown, and the single horizontal line 29 on the display at 27 represents a full 90 degrees of scan.

Each displayed scan line, as at 29, may be developed in suitably vertically depressed relation with previously displayed scan lines, so as to display on the face of tube 27 an integrated development of a number of scan lines, all in accordance with the teachings of our above-identified patent application. However, in the form shown, we employ no vertical deflection and rely on a transversely moving recording strip or film 30 to integrate successive scan lines. The film 30 is preferably at the focus of suitable optics 31 and is advanced by motor 32 and sprocket 33 at a rate proportional to the velocity-altitude function of the aircraft. We suggest such control at 34 and make reference to Blackstone application Serial No. 444,990, filed July 22, 1954, for further details of a suitable velocity-altitude device.

In the alternative depicted in Fig. 2, the display includes two separate projection systems, and the commutation of the separate video outputs of energy-responsive elements 12—13 involves alternately enabling and disabling the projection systems. The projection system 35 is shown to comprise a lamp 37, a light modulator 38, and a focusing element 39; the corresponding elements of the projection system 36 are similarly identified, but with primed notation. Both projection systems are preferably on spaced parallel axes bearing preferably the same relation to the axis of rotation of a projection mirror prism 40 as do the axes 16—17 to the rotation axis of scanning mirror 10. The video outputs of cells 12—13 are separately connected to the light modulators 38—38' by way of amplifiers 41—42, and control means 44 synchronized with scanner rotation alternately rendering amplifiers 41—42 conductive to provide the desired sharing of projection by the systems 35—36. In the form shown, the display means incorporates a strip of sensitive paper or film 45 in the focal plane of optics 39—39' and oriented to record scan lines transverse to the steady movement thereof; in Fig. 2, the spacing of projection systems 35—36 and of mirror 40, with respect to the surface of film strip 45, has been deliberately exaggerated in order better to display the parts, and the strip 45 will be understood to be of size and spacing from mirror 40 to record a full $$\frac{2\pi}{n} \text{—radian scan line}$$

A motor 46 and sprocket 47 serve as the drive means, and, as in the case of Fig. 1, a $V/H$-control device 34 may govern the movement of the recording film 45.

The basic geometry and sequential operation of elements 12—13 will be better understood by reference to the remaining figures. In Fig. 3, we show the end elevation of the scanning mirror 10 for the case in which a single energy-responsive element or cell is involved, this being representative of prior art operation. For scanning directly below the axis of rotation, the bundle of rays representing the image of the cell will occupy a central position 50 on any surface ($a$) when the scanner is (as depicted) at the center of the line scan for such surface ($a$). The lateral limits for which surface $a$ may intercept the full bundle of rays for such single cell will be symmetrically located on opposite sides of the image 50. These limits are determined for the case of the limiting-image bundle 51, by tangency with the line of intersection between surfaces $a$ and $b$; for the case of the limiting-image bundle 52, the limit is determined by the line of intersection between surfaces $a$ and $d$. The full scanable line for a single cell in cooperation with a single mirror is thus $\pi/n$ radans wide, about the scanner axis, as shown in the diagram.

In Fig. 4, we show essentially the same diagram as in Fig. 3, but offset angularly clockwise with respect to Fig. 3; the angular offset equals $\pi/2n$ radians, said angle $\pi/2n$ being the amount by which the axis 16 for one energy-responsive element 12 is offset from that vertical plane which includes the scanner rotation axis. The limits 53—54 for cell-image bundles in Fig. 4 thus represent the limits 20—21 in the field of Fig. 1.

The arrangement of Fig. 5 is essentially the same as in Fig. 4, except that counterclockwise rotation has been effected with respect to the diagram of Fig. 3, again by the amount $\pi/2n$ radians. The arrangement of Fig. 5 thus depicts the situation for the optical axis 17 of element 13, and the outer image bundles 55—56 represent limits 21—23 of the field of Fig. 1.

In Fig. 6, we show graphically the separate responses of cells 12—13, as well as commutation sequences for the video outputs of these cells, through a full cycle of rotation of the scanner 10. At the origin chosen, mirror 10 is in the orientation shown in Fig. 4, and thus the response of cell 12 is full and is at the half-way point, insofar as the scan line developed by surface $a$ on axis 16 is concerned. This state of affairs is schematically suggested by the heavy line 60 (and by the "on" condition 70 of switch 25), shown terminating 22.5 degrees later, at which time switch 25 cuts off the supply of video signal from 12 to the output line 24. At the same time, i. e. at the 22.5-degree rotation point, a full bundle of rays on axis 17 has just come onto the surface $a$ to determine full response of cell 13, and the heavy line 61 suggests this full response; during this full-response period 61 switch 25 connects cell 13 to the output line 24, and the "on" condition of switch 25 is suggested at 71. Response 61 extends a full 45 degrees and therefore terminates at the 67.5-degree point (with reference to the origin of Fig. 6), at which time another full response of cell 12 (suggested at 62 and at 70') has just been developed by mirror surface $b$. The alternate full responses of elements 12—13 are developed in like manner with further rotation, so that in continuous succession the further response periods 63—61—65—66—67 (with corresponding "on" conditions 71'—70"—71"—70'''—71''' of switch 24) will occur, before recycling (without interruption) the response 60. For any single mirror-surface sweep, such as the sweep of surface $a$ across the field of view, a single continuous video signal 60—61 will be developed. The next mirror surface $b$ will develop the single continuous video signal 62—63, and in like manner mirror surfaces $c$ and $d$ will develop the single continuous video signals 64—65 and 66—67, respectively.

It will be seen that we have described a relatively simple mechanism for developing single video-scan lines across substantially enlarged angular fields of view. The arrangement is such as to utilize only potentially full-strength video signals and yet to incur no dead time or non-utilizable time while video signals are developing to potentially full strength for a given scanner or reflecting surface.

While we have described the invention in detail for the preferred forms illustrated, it will be understood that modifications may be made within the scope of the invention as defined in the claims which follow.

We claim:

1. Optical scanning means for scanning in essentially a given surface from a location offset from said surface, comprising two adjacent relatively fixedly mounted energy-responsive elements, optics including a scanning reflecting surface mounted for rotation about an axis substantially 45 degrees to said reflecting surface, said axis of rotation being substantially parallel to the surface to be scanned, the predominant response axes of said energy-responsive elements being oriented substantially parallel to the axis of rotation of said reflecting surface, whereby separate images of said separate energy-responsive elements are developed by said scanning reflecting surface in the surface to be scanned, and whereby, upon rotation of said scanning surface said images scan a line in said given surface transverse to the axis of rotation, said reflecting surface being sufficiently extensive to cause the full image of each of said elements to scan contiguous segments of a single scan line, and display means including means synchronized with rotation of said reflecting surface and modulated by alternately commutated video outputs of said energy-responsive elements.

2. Optical scanning means for scanning in essentially a given surface from a location offset from said surface, comprising two spaced relatively fixedly mounted energy-responsive elements and fixed optical elements associated therewith on similarly spaced substantially parallel axes, optics including a scanning reflecting surface inclined to a plane normal to said parallel axes and inclined to the surface to be scanned, means for rotating said reflecting surface about an axis substantially parallel to said parallel axes but offset therefrom, whereby separate images of said separate energy-responsive elements are developed by said scanning reflecting surface in the surface to be scanned, and whereby, upon rotation of said scanning surface, said images scan a line in said given surface transverse to the axis of rotation, said reflecting surface being sufficiently extensive to cause the full image of each of said elements to scan contiguous segments of a single scan line, and display means including means synchronized with rotation of said reflecting surface and modulated by alternately commutated video outputs of said energy-responsive elements.

3. Scanning means according to claim 2, in which said display means includes a switch having a single output and having separate inputs for the respective video outputs of said energy-responsive elements.

4. Scanning means according to claim 2, in which said display means includes separate channels for the video outputs of said respective energy-responsive elements, and control means opening and blocking said channels in alternation and in synchronism with rotation of said reflecting surface.

5. Optical scanning means for scanning in essentially a given surface from a location offset from said surface, comprising a pyramid mirror having a plurality of inclined reflecting surfaces angularly spaced about a central axis, said axis being substantially parallel to the surface to be scanned, means for rotating said mirror about said axis, two closely adjacent relatively fixedly mounted energy-responsive elements, and optical elements associated therewith on similarly spaced substantially parallel axes, each surface of said mirror being disposed to sequentially intercept said parallel axes upon rotation of said mirror, remote plane, and display means including means commutating the outputs of said energy-responsive elements and synchronized with rotation of said mirror.

6. Scanning means according to claim 5, in which the angular separation of said parallel axes about said axis of rotation is substantially equal to $\pi$, divided by the number of sloping surfaces of said mirror.

7. An aircraft-reconnaissance device, comprising a pyramid mirror having a plurality of like inclined reflecting plane surfaces equally angularly spaced about a central axis, means continuously rotating said mirror about said axis and with said axis oriented substantially in alignment with the flight axis of an aircraft, two spaced energy-responsive elements and fixed optics associated with each spaced substantially parallel axes parallel to said axis of rotation and offset below the same by an amount substantially equal to the radial offset of said sloping surfaces from said axis of rotation, said parallel axes being equally angularly spaced on opposite sides of the vertical plane including said axis of rotation by an amount substantially equal to $\pi$, divided by the number of sloping surfaces of said mirror, whereby the video output developed by one of said energy-responsive elements may reflect line scanning of the terrain beneath the aircraft and extending through a first angle transversely of the flight axis and to one side of that vertical plane which includes the flight axis, and whereby the video output of the other energy-responsive element may reflect line scanning extending through a second angle transversely of the flight axis and to the other side of said vertical plane, and display means including means synchronized with rotation of said mirror and modulated by alternately commutated video outputs of said energy-responsive elements.

8. A device according to claim 7, and including a single-line video display, intensity-modulated for any one line sweep thereof by alternate samplings of the video outputs of said energy-responsive elements.

9. A device according to claim 7, in which said display means comprises a projection display including a pyramid mirror synchronized with rotation of said first-mentioned mirror, and two separate light-projection systems on spaced axes directed at said last defined mirror and connected to the respective video outputs of said energy-responsive elements.

References Cited in the file of this patent

UNITED STATES PATENTS

| | | |
|---|---|---|
| 1,697,941 | Glowacki | Jan. 8, 1929 |
| 2,408,115 | Varian | Sept. 24, 1946 |
| 2,465,957 | Dienstbach | Mar. 29, 1949 |
| 2,490,899 | Cohen | Dec. 13, 1949 |
| 2,506,946 | Walker | May 9, 1950 |
| 2,597,001 | Jaffee | May 20, 1952 |
| 2,779,819 | Graham et al. | Jan. 29, 1957 |

FOREIGN PATENTS

| | | |
|---|---|---|
| 670,960 | Great Britain | Apr. 30, 1952 |